(12) United States Patent
Sekine et al.

(10) Patent No.: US 8,844,591 B2
(45) Date of Patent: Sep. 30, 2014

(54) PNEUMATIC TIRE

(75) Inventors: Katsuyoshi Sekine, Hiratsuka (JP); Masatoshi Kuwajima, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 52 days.

(21) Appl. No.: 13/381,867

(22) PCT Filed: Jun. 14, 2010

(86) PCT No.: PCT/JP2010/060059
§ 371 (c)(1),
(2), (4) Date: Dec. 30, 2011

(87) PCT Pub. No.: WO2011/001814
PCT Pub. Date: Jan. 6, 2011

(65) Prior Publication Data
US 2012/0103490 A1 May 3, 2012

(30) Foreign Application Priority Data

Jul. 1, 2009 (JP) ................................ 2009-157324

(51) Int. Cl.
*B60C 11/117* (2006.01)
*B60C 11/12* (2006.01)
*B60C 11/11* (2006.01)

(52) U.S. Cl.
CPC ............... *B60C 11/12* (2013.01); *B60C 11/11* (2013.01); *B60C 2011/1213* (2013.01); *B60C 11/1281* (2013.01); *B60C 2011/1227* (2013.01); *B60C 2011/1254* (2013.01); *Y10S 152/03* (2013.01)
USPC .................. 152/209.17; 152/DIG. 3

(58) Field of Classification Search
CPC B60C 11/12; B60C 11/1204; B60C 11/1222; B60C 11/1236; B60C 11/032; B60C 11/0323; B60C 2011/1209; B60C 2011/1254
USPC .............. 152/209.17, 209.18, 209.21, DIG. 3
IPC ........................................................ B60C 11/12
See application file for complete search history.

(56) References Cited

U.S. PATENT DOCUMENTS

| 5,048,583 A * | 9/1991 | Goto et al. ............... 152/209.17 |
| 6,003,575 A * | 12/1999 | Koyama et al. ........... 152/209.18 |
| 2011/0126949 A1* | 6/2011 | Cuny et al. ................ 152/154.2 |

FOREIGN PATENT DOCUMENTS

| EP | 2436537 | 4/2012 |
| JP | 62-206139 | 8/1987 |

(Continued)

OTHER PUBLICATIONS

Machine Translation: JP09-263111; Suda, Yasutaka; (No Date).*

(Continued)

*Primary Examiner* — Steven D Maki
*Assistant Examiner* — Kendra Shin
(74) *Attorney, Agent, or Firm* — Thorpe North & Western LLP

(57) ABSTRACT

A pneumatic tire including a closed sipe in a land portion formed in a tread surface, provided with at least three cuts extending in a radiation direction from an imaginary axis that extends in a depth direction of the land portion, and that terminate in the land portion. A widened portion where a width of a cut is locally increased is formed at at least one position of an intermediate region from the imaginary axis to a terminating portion of the cuts.

17 Claims, 5 Drawing Sheets

(56) References Cited

FOREIGN PATENT DOCUMENTS

| | | | | |
|---|---|---|---|---|
| JP | 01-047603 | 2/1989 | | |
| JP | O1-132146 | 5/1989 | | |
| JP | 02-310108 | 12/1990 | | |
| JP | 07-348906 | 12/1995 | | |
| JP | 08118918 A * | 5/1996 | ............. | B60C 11/11 |
| JP | 08-276709 | 10/1996 | | |
| JP | 08276709 A * | 10/1996 | ............. | B60C 11/12 |
| JP | 09263111 A * | 10/1997 | ............. | B60C 11/12 |
| JP | 2000-217047 | 7/2000 | | |
| JP | 2002-029226 | 1/2002 | | |
| JP | 2004-185502 | 6/2004 | | |
| JP | 2004-361513 | 12/2004 | | |
| JP | 2006-007882 | 1/2006 | | |
| JP | 2006007882 A * | 1/2006 | ............. | B60C 11/12 |
| JP | 2006-027306 | 2/2006 | | |
| JP | 2006027306 A * | 2/2006 | ............. | B60C 11/12 |
| JP | 2006-168462 | 6/2006 | | |
| JP | 2007-159362 | 6/2007 | | |
| JP | 2008-308093 | 12/2008 | | |

OTHER PUBLICATIONS

Machine Translation: JP08-276709; Nakazato, Koichi; (No Date).*
Machine Translation: JP2006-027306; Ebiko Masahiro; (No Date).*
Machine Translation: JP2006-007882; Osawa, Yasuo; (No Date).*
Machine Translation: JP08-118918; Nakamura; Hiroshi; (No Date).*
European Search Report, dated Nov. 29, 2012, 5 pages, Germany.
PCT Application PCT/JP2010/060059; filed ; Jun. 14, 2010; International Search Report mailed Jul. 27, 2010.

* cited by examiner

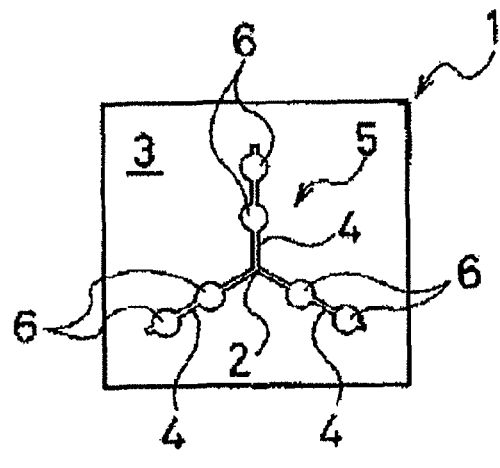 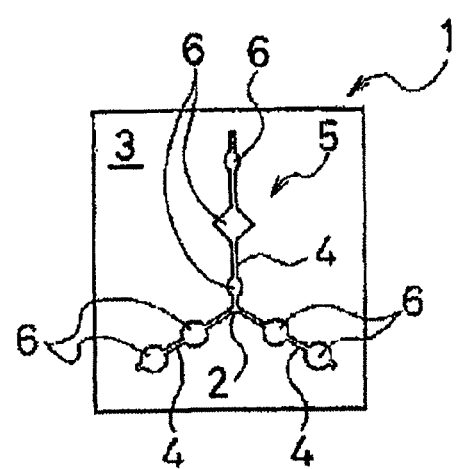
FIG. 3A          FIG. 3B
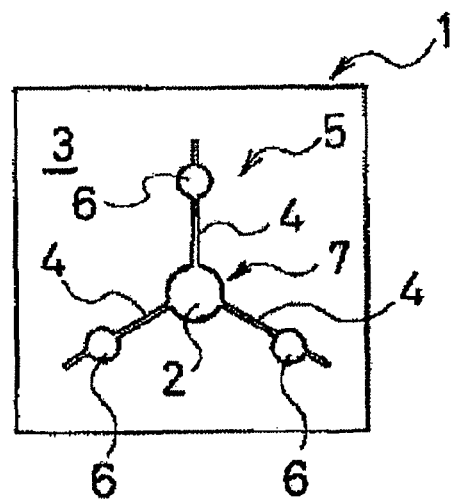 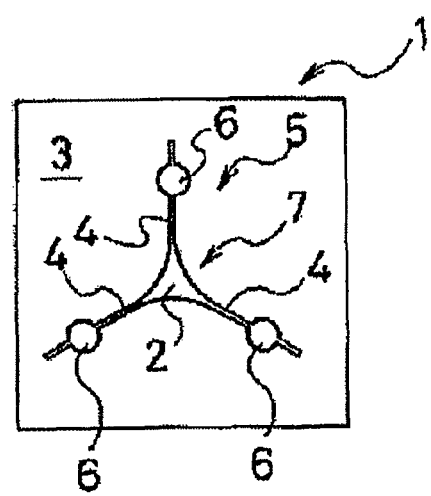
FIG. 4A          FIG. 4B

PNEUMATIC TIRE

TECHNICAL FIELD

The present technology relates to a pneumatic tire, and particularly relates to a pneumatic tire configured so that braking performance on ice is enhanced in a tire having sipes formed in a tread surface thereof.

BACKGROUND ART

Sipes are commonly provided in a tread surface to enhance water absorption in order to enhance traveling performance on wet road surfaces and icy and snowy road surfaces. However, if an excessive number of sipes are disposed in the tread surface, tread rigidity will decline, leading to steering stability and braking ability being negatively affected. Therefore, conventionally, various technologies have been proposed regarding the form and arrangement of sipes (e.g. see Japanese Unexamined Patent Application No. H08-276709A).

Of these proposals, Japanese Unexamined Patent Application No. H08-276709A describes obtaining high gripping force and shearing rigidity on all road surfaces by disposing multiple sipes closely to each other in a tread surface where a planar form of the sipes is an "I" shape or a "Y" shape and an end of a cut has a round shape. However, with this proposal, it is difficult to ensure tread rigidity due to a disposal spacing of the sipes being excessively narrow and, even if the disposal spacing of the sipes is increased, because the width of the cuts of the sipes is formed equally with respect to the longitudinal direction, when the tread surface contacts the ground, the sipes will not open sufficiently, leading to the water absorption effect of the sipes being limited.

SUMMARY

The present technology provides a pneumatic tire configured so that braking performance on ice is enhanced in a tire having sipes formed in a tread surface thereof.

A pneumatic tire of the present technology includes a closed sipe in a land portion formed in a tread surface, provided with at least three cuts extending in a radiation direction from an imaginary axis that extends in a depth direction of the land portion, and that terminate in the land portion. A widened portion where a width of a cut is locally increased is formed at least one position of an intermediate region from the imaginary axis to a terminating portion of the cuts.

Furthermore, the configuration described above is preferably configured as described in (1) to (4) below.

(1) A width of the widened portion is not less than 1.5 times and less than 20 times the width of the cuts.

(2) The widened portion is formed throughout an entire length of the cuts in the depth direction.

(3) A second widened portion where the width of a cut is increased is formed along the imaginary axis. In this case, the second widened portion is preferably formed throughout the entire length of the closed sipe in the depth direction.

(4) Linear sipes extending in a tire width direction are provided along with the closed sipes in the land portion. In this case, when the land portion is a block, the closed sipes are preferably arranged along a tire width direction in a front edge and/or a back edge in a tire circumferential direction of the block.

According to the present technology, a pneumatic tire includes a closed sipe in a land portion formed in a tread surface, provided with at least three cuts extending in a radiation direction from an imaginary axis that extends in a depth direction of the land portion, and that terminate in the land portion. A widened portion where a width of a cut is locally increased is formed at least one position of an intermediate region from the imaginary axis to a terminating portion of the cuts. Therefore, due to the tread contact pressure caused by the tire contacting the ground, when traveling on icy road surfaces, the cuts open widely in a width direction centered on the widened portion, thus facilitating the flow of water on the icy road surface to the widened portion. The water that flows into the widened portion is efficiently dispersed toward the cuts and, therefore, water absorption and discharging functions can be advanced and braking performance on ice can be enhanced.

BRIEF DESCRIPTION OF THE DRAWINGS

FIGS. 3A and 3B are plan views corresponding with FIG. 1, which illustrate closed sipes according to another embodiment of the present technology.

FIGS. 4A and 4B are plan views corresponding with FIG. 1, which illustrate closed sipes according to yet another embodiment of the present technology.

DETAILED DESCRIPTION

Detailed descriptions will be given below of a configuration of the present technology with reference to the accompanying drawings.

Figure 1:
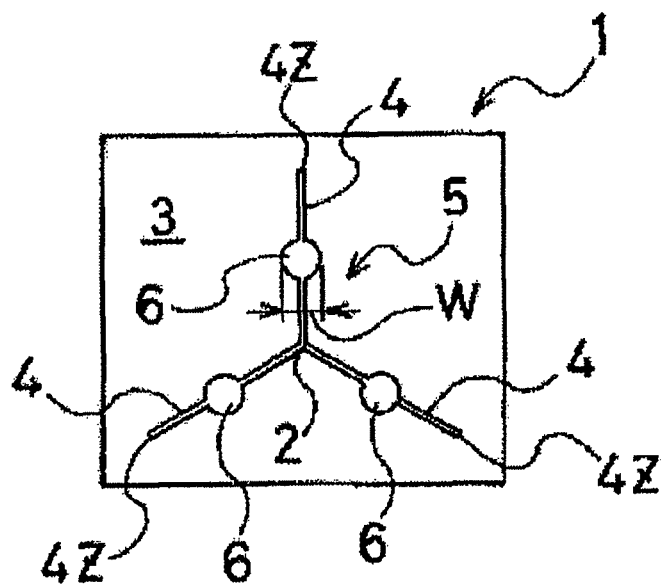
FIG. 1 is a plan view illustrating an example of a form of a closed sipe formed in a tread surface of a pneumatic tire according to an embodiment of the present technology.
Figure 2:
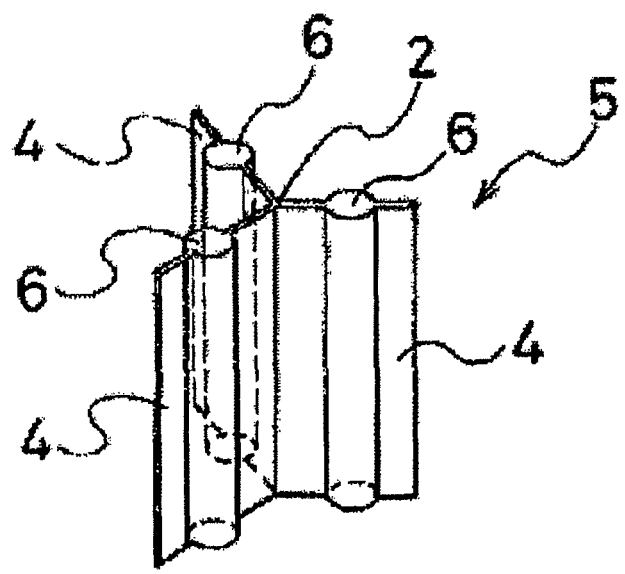
FIG. 2 is a perspective view illustrating an outer wall form of the closed sipe of FIG. 1.

FIG. 1 is a plan view illustrating (in a rectangle) an example of a form of a closed sipe formed in a tread surface of a pneumatic tire of the present technology. FIG. 2 is a perspective view illustrating an outer wall form of the closed sipe of FIG. 1.

In FIG. 1, a land portion 3 is formed in a tread surface 1 of a pneumatic tire of the present technology. A closed sipe 5 is formed in the land portion 3 including at least three cuts 4 (three in the drawing) extending in a radiation direction from an imaginary axis 2 that extends in a depth direction of the land portion 3, and that terminate in the land portion 3.

Moreover, in the closed sipe 5 of the present technology, a widened portion 6 where a width of a cut is locally increased is formed at least one position of an intermediate region from the imaginary axis 2 to a terminating portion 4z of each of the cuts 4.

As a result, due to the tread contact pressure caused by the tire contacting the ground, when traveling on icy road surfaces, the cuts 4 open widely in a width direction centered on the widened portion 6, thus facilitating the flow of water on the icy road surface to the widened portion 6. The water that flows into the widened portion 6 is efficiently dispersed toward the cuts 4 and, therefore, water absorption and discharging functions can be advanced and braking performance on ice can be enhanced.

Note that with the embodiment of FIG. 1, an example is illustrated in which the planar form of the widened portion 6 is circular, but the planar form of the widened portion 6 is not limited thereto and can be elliptical or polygonal. In such a case, from the perspective of effecting a configuration in which cracking due to a concentration of stress in a wall face of the widened portion 6 does not occur, a form of the wall face is preferably configured so as to have a curvature.

In the present technology, a width w of the widened portion 6 is configured to be not less than 1.5 times and less than 20 times, and preferably is from 2.0 to 5.0 times the width of the cuts 4. If the width w of the widened portion 6 is less than 1.5 times the width of the cuts 4, the braking performance on ice will not be enhanced, and if greater than or equal to 20 times the width of the cuts 4, uneven wear in the vicinity of the widened portion 6 may be prone to occur and steering stability may be negatively affected due to a decrease in the rigidity of the land portion 3.

Note that the width of the cuts 4 is not particularly limited, but commonly is preferably set to from about 0.3 to 2.0 mm. Additionally, in accordance with the type and size of the tire, a maximum for the width w of the widened portion 6 is preferably configured to be less than or equal to about 8 mm. However, when the tire is a large tire for use on construction vehicles or the like, the maximum for the width w may be configured to be greater.

Moreover, a depth of the widened portion 6 formed in the cuts 4 is not particularly limited, but as illustrated in FIG. 2, the widened portion 6 is preferably formed throughout an entirety of the depth direction of the cuts 4 in order to ensure excellent water absorption and discharging functions. In such a case, the width w of the widened portion 6 can be increased along the depth direction of the cuts 4 in order to ensure braking performance on ice over an extended period of time. In this case, the width w of the widened portion 6 is preferably formed so as to increase in a gradual or stepwise manner along the depth direction of the cuts 4.

Note that in the embodiment of FIG. 1, an example has been described in which the widened portion 6 has been formed in one position in each of the three cuts 4 forming the closed sipe 5. However, as illustrated in FIGS. 3A and 3B, with the closed sipe 5 of the present technology, the widened portion 6 may be formed in two or more positions in each of the cuts 4. Additionally, the widened portion 6 can also be formed in terminating portions of the cuts 4.

Furthermore, in accordance with the form of the tread pattern formed in the tread surface 1, from the perspective of adjusting the rigidity and the water absorption and discharging functions of the land portion 3, as illustrated in FIG. 3B, a size and a planar form of each of the widened portions 6 formed in each of the cuts 4 can be varied.

In the present technology, as illustrated in FIGS. 4A and 4B, a second widened portion 7 where the width of a cut is increased is more preferably formed along the imaginary axis 2 positioned at the center of the closed sipe 5. As a result, braking performance on ice can be further enhanced.

A cross-sectional form of the second widened portion 7 is not particularly limited but, as illustrated in FIG. 4A, is preferably circular or, in accordance with the number of the cuts 4 forming the closed sipe 5, as illustrated in FIG. 4B, is polygonal or star shaped. In such a case, the second widened portion 7 preferably is formed so that the cross-sectional form thereof has a curvature, the same as the widened portion 6, so that stress does not concentrate in wall faces in the vicinity of the second widened portion 7. Here, a size of the second widened portion 7 is set on a case-by-case basis in accordance with the type and size of the tire.

In the present technology, a depth of the second widened portion 7 is not particularly limited, but the widened portion 7 is preferably formed throughout an entirety of the depth direction of the closed sipe 5 in order to ensure excellent water absorption and discharging functions. In such a case, as with the width w of the widened portion 6 described above, the size of the second widened portion 7 can be increased in a gradual or stepwise manner along the depth direction of the cuts 4. Thereby, excellent braking performance on ice over an extended period of time can be further enhanced.

In the embodiment described above, the widths of each of the cuts 4 forming the closed sipe 5 were discussed under the assumption that the widths were uniform with respect to the depth direction of the land portion 3. However, with the closed sipe 5 of the present technology, the width of the cuts 4 may be formed so as to increase along the depth direction of the land portion 3. In such a case, excellent braking performance on ice over an extended period of time can be ensured.

Furthermore, with the pneumatic tire of the present technology, in accordance with the characteristics desired from the tire, the form of the radiation direction of the cuts 4 forming the closed sipe 5 may be configured so as to have a curving (arch), a wavelike, or a zigzag form, and a length of the radiation direction of the cuts 4 may vary with respect to the depth direction.

With the pneumatic tire of the present technology, the closed sipe 5 described above is preferably disposed so as to be dispersed throughout an entire surface of the land portion 3 formed in the tread surface 1. In this case, from the perspectives of uniformly maintaining a rigidity distribution of the land portion 3 and suppressing uneven wear, the closed sipe 5 is preferably disposed so that the cuts 4 that form the closed sipe 5 are not near each other.

Figure 5:
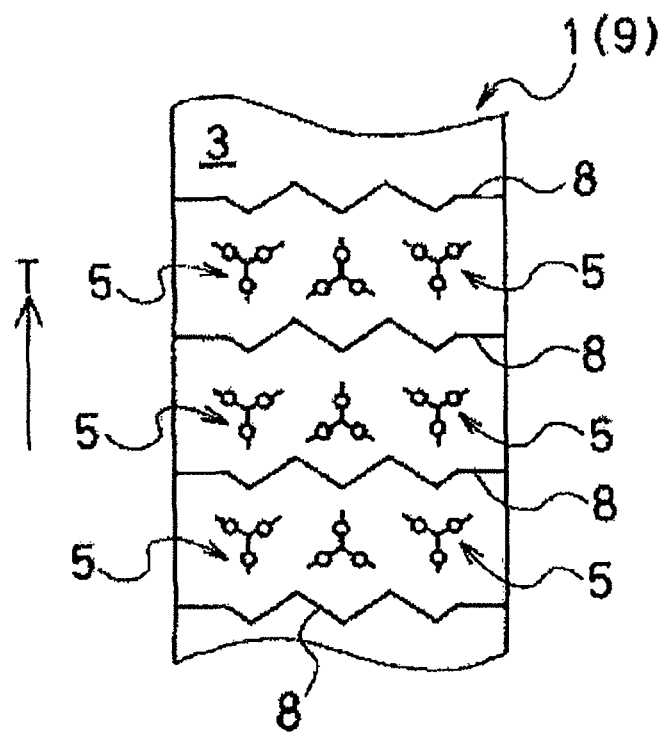
FIG. 5 is a plan view illustrating a portion of the tread surface of the pneumatic tire according to an embodiment of the present technology.
Figure 6:
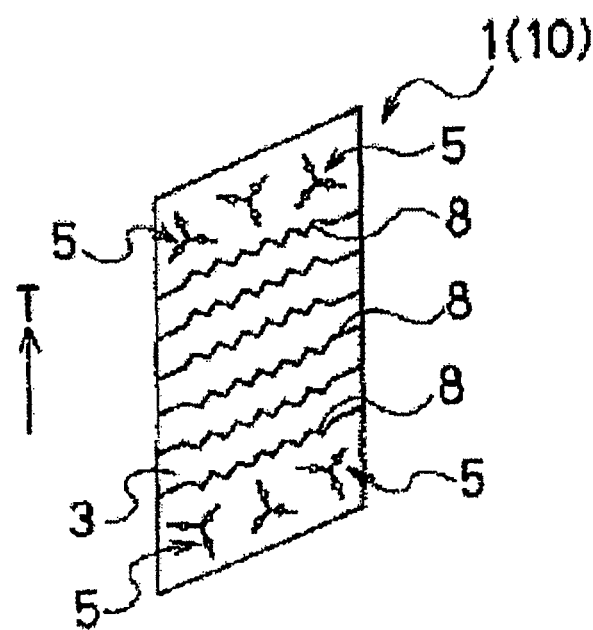
FIG. 6 is a plan view illustrating a portion of the tread surface of the pneumatic tire according to another embodiment of the present technology.

Furthermore, depending on the characteristics desired from the tire, as illustrated in FIGS. 5 and 6, the closed sipe 5 can be disposed in the land portion 3 formed in the tread surface 1 along with a linear sipe 8 extending in the tire width direction. As a result, the edge effects resulting from the disposal of the linear sipe 8 are increased, and a high degree of both steering stability and braking performance on ice can be achieved.

In FIG. 5, an example is illustrated in which a plurality of the closed sipe 5, disposed in parallel in a surface of a rib 9 formed in the tread surface 1, and the linear sipe 8, having a zigzag form extending in the tire width direction, are disposed alternately in a tire circumferential direction T. However, the form of the linear sipe 8 and the arrangement thereof are not limited thereto, and can be modified as desired depending on the form of the tread pattern. Examples of the form of the linear sipe 8 include substantially linear or wavelike forms, three-dimensional forms, and the like.

Additionally, as illustrated in FIG. 6, when a block 10 is formed in the tread surface 1, the block 10 is partitioned by the linear sipe 8 that extends in the tire width direction; and the closed sipe 5 is preferably disposed along the tire width direction in a front edge and/or back edge in the tire circumferential direction, which correspond to a trailing edge side and/or a leading edge side (in FIG. 6, the front edge and the back edge), of the block 10.

Particularly, to an extent possible, the closed sipe 5 of the present technology is preferably disposed along the tire width direction, without the linear sipe 8 extending in the tire width direction being formed in regions of the front edge and/or the back edge corresponding to about 30% or less of a length of the block 10 in the tire circumferential direction. As a result, block rigidity in the front edge and/or the back edge of the block 10 can be ensured, steering stability can be enhanced while the generation of uneven wear is suppressed, water absorption can be enhanced, and braking performance on ice can be enhanced.

As described above, a pneumatic tire of the present technology includes a closed sipe in a land portion formed in a tread surface, provided with at least three cuts extending in a radiation direction from an imaginary axis that extends in a depth direction of the land portion, and that terminate in the land portion. Additionally, a widened portion where a width of a cut is locally increased is formed at least one position of an intermediate region from the imaginary axis to a terminating portion of the cuts. As a result, braking performance when traveling on icy road surfaces is enhanced and, therefore, the pneumatic tire of the present technology can be widely applied to studless tires for use on icy and snowy road surfaces because superior effects can be provided while realizing a simple construction.

EXAMPLES

Figure 7:
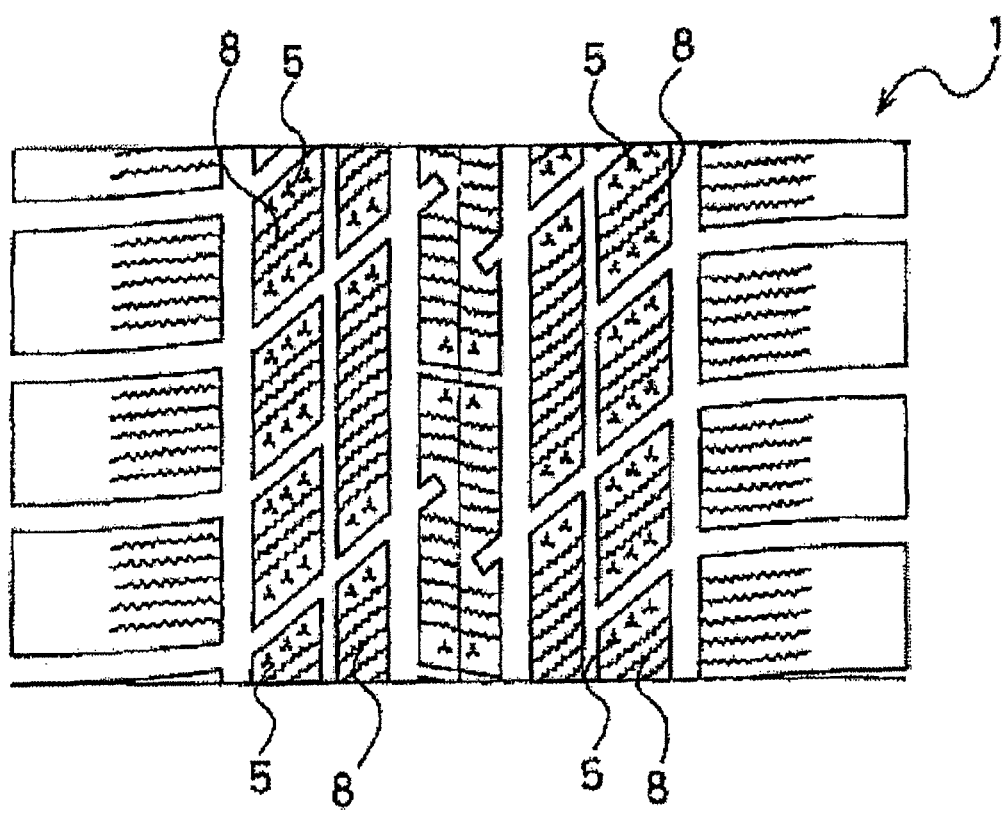
FIG. 7 is a partial plan view illustrating the tread surface of the pneumatic tire used in the examples.

Present technology tires (Working Examples 1 to 11) and comparative tires (Comparative Examples 1 and 2) having a tire size of 195/65R15 91Q and the tread pattern illustrated in FIG. 7 were fabricated. The planar form of the closed sipe 5 formed in the land portion was varied as described below.

The tires of Working Examples 1 to 11 and the tires of Comparative Examples 1 and 2 were fabricated such that the planar form of the closed sipe 5, the width of the widened portion 6, a ratio of the widened portion 6 to the width of the cuts 4, whether the widened portion 6 is disposed throughout the entire length in the depth direction of the cuts, the presence/absence of the second widened portion 7, whether the second widened portion 7 is disposed throughout the entire length in the depth direction of the cuts, the presence/absence of the linear sipe 8 extending in the tire width direction, and whether the closed sipe 5 is disposed on the front edge and the back edge of the block in the tire circumferential direction were varied as shown in Table 1.

In each of the tires of the Working Examples and the Comparative Examples, the planar form of the widened portion 6 was a circular cross-section, the width of the cuts 4 was 0.5 mm (except in Working Example 3 where the width was 0.2 mm), and the depth of the closed sipe 5 was 7 mm.

Each of these types of tires was evaluated for braking performance on ice according to the test method described below. The results were indexed and recorded in Table 1, with the index value of Comparative Example 1 being set to 100. A larger index value indicates superior braking performance on ice.

Braking Performance on Ice Test

Each tire was assembled on a 15×6JJ rim, inflated to an air pressure of 230 kPa, and mounted on the front and back wheels of a passenger car (made in Japan) having an engine displacement of 2,000 cc. A braking test from an initial speed of 40 km/hr was performed on an icy road surface, and braking performance on ice was evaluated based on the inverse of the stopping distance following application of the brakes.

TABLE 1

Figures 8A, 8B:
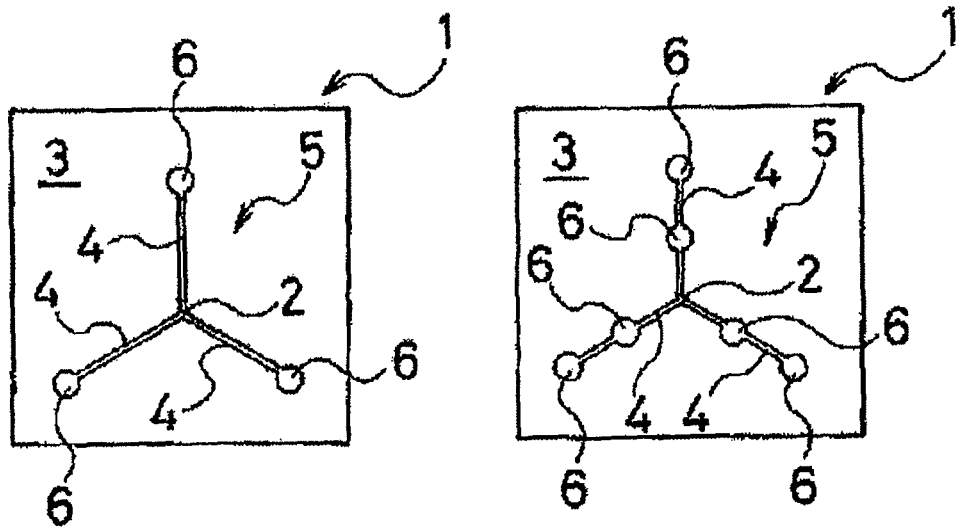
FIGS. 8A to 8C are plan views corresponding with FIG. 1, which illustrate forms of the closed sipes used in the tires of the examples.
Figure 8C:
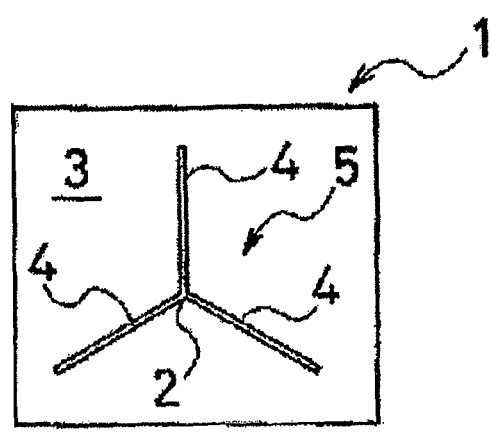

|  |  | Comparative Example 1 | Comparative Example 2 | Working Example 1 | Working Example 2 | Working Example 3 | Working Example 4 |
| --- | --- | --- | --- | --- | --- | --- | --- |
| Planar form of closed sipe |  | FIG. 8A | FIG. 8C | FIG. 1 | FIG. 1 | FIG. 1 | FIG. 1 |
| Width of cuts |  | 0.5 | 0.5 | 0.5 | 0.5 | 0.2 | 0.5 |
| Width of widened portion |  | 1.8 | — | 0.6 | 0.75 | 3.2 | 0.6 |
| Ratio of width of widened portion to width of cuts |  | 3.6 | — | 1.2 | 1.5 | 16 | 12 |
| Whether widened portion is disposed throughout entire length in depth direction of cuts |  | Entire length | — | — | — | — | Entire length |
| Presence/absence of second widened portion |  | Absent | Absent | Absent | Absent | Absent | Absent |
| Whether second widened portion is disposed throughout entire length in depth direction of cuts |  | — | — | — | — | — | — |
| Presence/absence of width direction linear sipe |  | Present | Present | Absent | Absent | Absent | Absent |
| Presence/absence of disposition on front edge and back edge |  | Present | Present | Absent | Absent | Absent | Absent |
| Evaluation Results | Braking performance on ice | 100 | 98 | 102 | 103 | 104 | 103 |

|  | Working Example 5 | Working Example 6 | Working Example 7 | Working Example 8 | Working Example 9 | Working Example 10 | Working Example 11 |
| --- | --- | --- | --- | --- | --- | --- | --- |
| Planar form of closed sipe | FIG. 4A | FIG. 4A | FIG. 1 | FIG. 1 | FIG. 4A | FIG. 3A | FIG. 8B |
| Width of cuts | 0.5 | 0.5 | 0.5 | 0.5 | 0.5 | 0.5 | 0.5 |
| Width of widened portion | 0.6 | 0.6 | 0.6 | 1.8 | 1.8 | 1.9 | 1.8 |
| Ratio of width of widened portion to width of cuts | 1.2 | 1.2 | 1.2 | 3.6 | 3.6 | 3.6 | 3.6 |

TABLE 1-continued

| | Col1 | Col2 | Col3 | Col4 | Col5 | Col6 | Col7 |
|---|---|---|---|---|---|---|---|
| Whether widened portion is disposed throughout entire length in depth direction of cuts | — | — | — | Entire length | Entire length | Entire length | Entire length |
| Presence/absence of second widened portion | Present | Present | Absent | Absent | Present | Absent | Absent |
| Whether second widened portion is disposed throughout entire length in depth direction of cuts | — | Entire length | — | — | Entire length | — | — |
| Presence/absence of width direction linear sipe | Absent | Absent | Present | Present | Present | Present | Present |
| Presence/absence of disposition on front edge and back edge | Absent | Absent | Absent | Present | Present | Present | Present |
| Evaluation Results — Braking performance on ice | 103 | 103 | 103 | 104 | 106 | 106 | 105 |

It is clear from Table 1 that the present technology tires display braking performance on ice superior to that of the comparative tires.

What is claimed is:

1. A pneumatic tire comprising:
   a land portion formed in a tread surface; and
   a closed sipe provided in the land portion with at least three cuts extending in a radiation direction from an imaginary axis that extends in a depth direction of the land portion, and that terminate in the land portion, wherein a widened portion where a width of a cut is locally increased is formed at at least one position of an intermediate region between the imaginary axis and a terminating portion of the cuts, wherein the widened portion is not formed at the terminating portion of the cuts and the widened portion is not formed at the imaginary axis, and
   each of the cuts of the closed sipe has a terminating portion in the land portion.

2. The pneumatic tire according to claim 1, wherein a width of the widened portion is not less than 1.5 times and less than 20 times a width of the cuts.

3. The pneumatic tire according to claim 1, wherein the widened portion is formed throughout an entire length of the cuts in the depth direction.

4. The pneumatic tire according to claim 1, wherein a second widened portion where the width of a cut is increased is formed along the imaginary axis.

5. The pneumatic tire according to claim 4, wherein the second widened portion is formed throughout the entire length of the closed sipe in the depth direction.

6. The pneumatic tire according to claim 1, wherein a linear sipe extending in a tire width direction is provided along with the closed sipe in the land portion.

7. The pneumatic tire according to claim 6, wherein the land portion is a block, and the closed sipe is arranged along a tire width direction in a front edge and/or a back edge in a tire circumferential direction of the block.

8. The pneumatic tire according to claim 1, wherein a planar form of the widened portion is circular, elliptical or polygonal.

9. The pneumatic tire according to claim 1, wherein the widened portion comprises a wall face configured so as to have a curvature.

10. The pneumatic tire according to claim 1, wherein a width of the widened portion is from 2.0 times to 5.0 times a width of the cuts.

11. The pneumatic tire according to claim 1, wherein a width of the cuts is set to from 0.3 to 2.0 mm.

12. The pneumatic tire according to claim 1, wherein a maximum width of the widened portion is configured to be less than or equal to about 8 mm.

13. The pneumatic tire according to claim 1, wherein the widened portion is formed throughout an entirety of the depth direction of the cuts.

14. The pneumatic tire according to claim 1, wherein a width of the widened portion is formed so as to increase in a gradual or stepwise manner along the depth direction of the cuts.

15. The pneumatic tire according to claim 1, further comprising a second widened portion, wherein a width of at least one of the at least three cuts is increased is formed along the imaginary axis positioned at the center of the closed sipe.

16. The pneumatic tire according to claim 1, wherein the closed sipe is disposed so as to be dispersed throughout an entire surface of the land portion formed in the tread surface and is disposed so that the cuts that form the closed sipe are not near each other.

17. The pneumatic tire according to claim 1, wherein:
   a linear sipe extending in a tire width direction is provided along with the closed sipe in the land portion;
   the land portion is a block, and the closed sipe is arranged along a tire width direction in a front edge and/or a back edge in a tire circumferential direction of the block; and
   the linear sipe is not formed in the tire width direction in regions of the front edge and/or the back edge corresponding to about 30% or less of a length of the block in the tire circumferential direction.

* * * * *